Feb. 28, 1933.  U. NUDELL  1,899,521
METHOD OF MAKING REENFORCED VULCANITE DENTURES
Filed Nov. 2, 1931  3 Sheets-Sheet 1
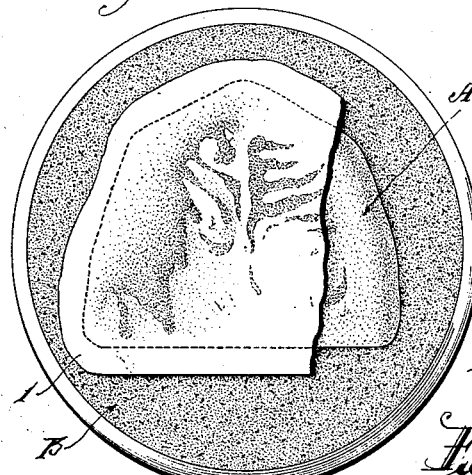
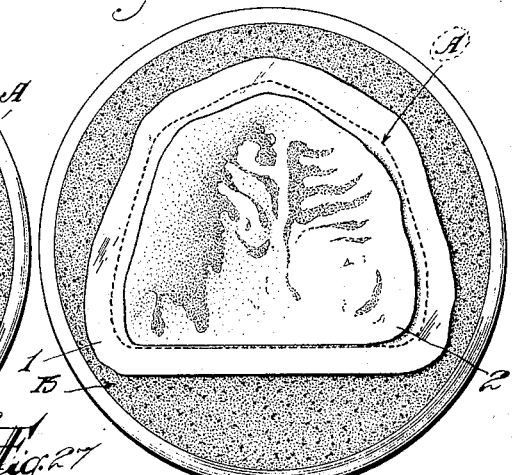
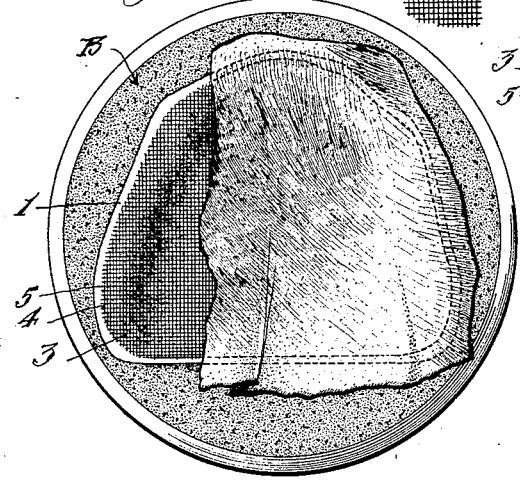
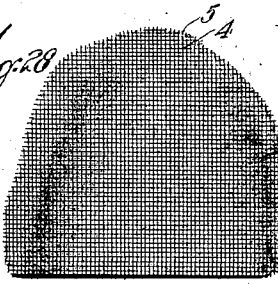
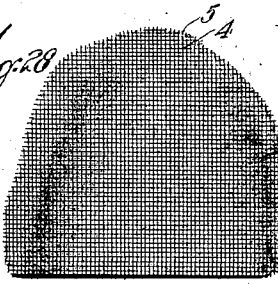
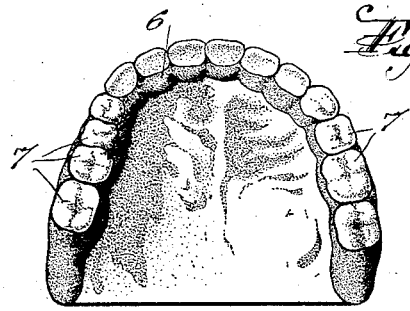
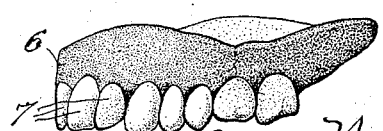
INVENTOR.
Uga Nudell,
BY
Everett H. Rook,
ATTORNEYS.

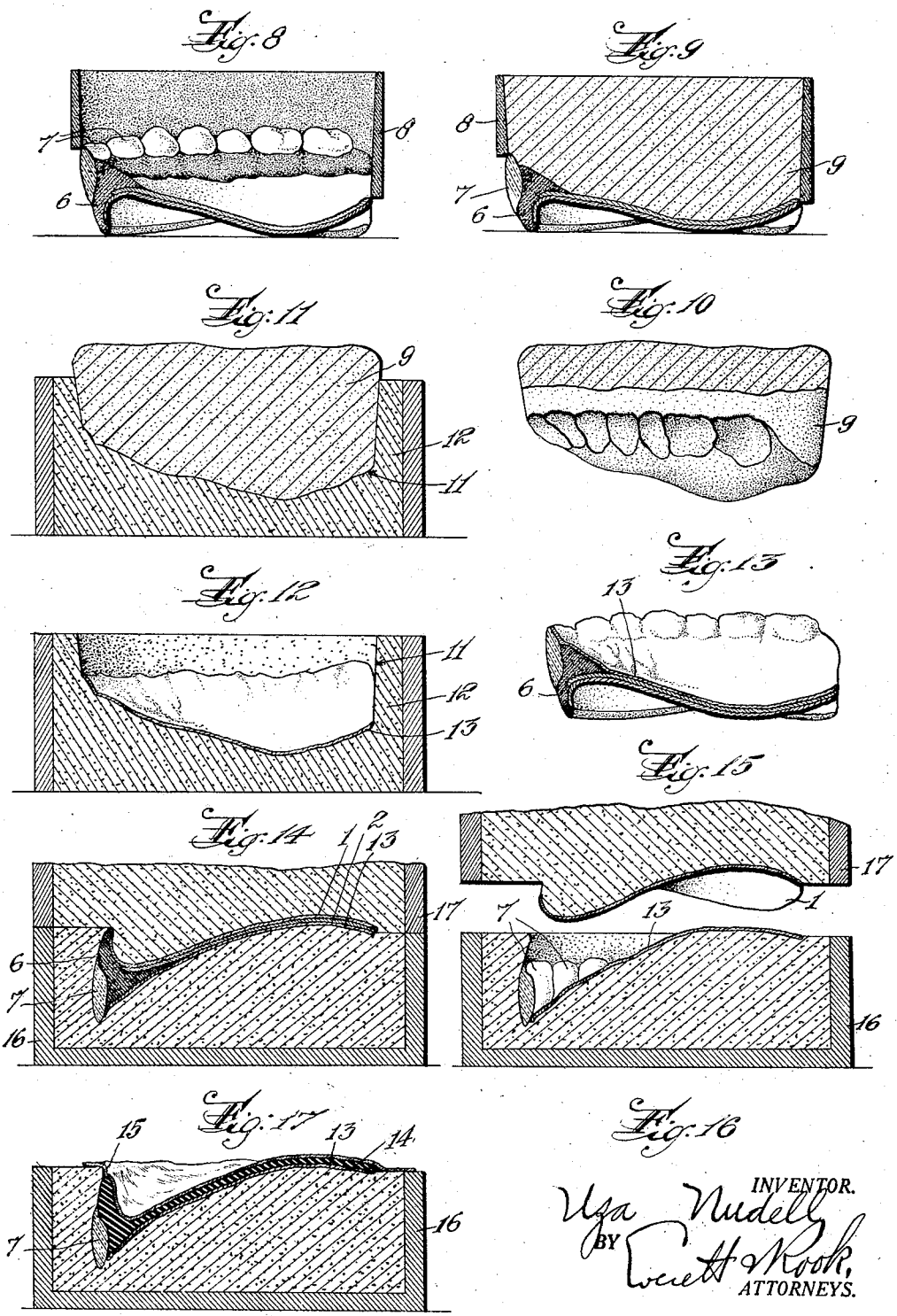

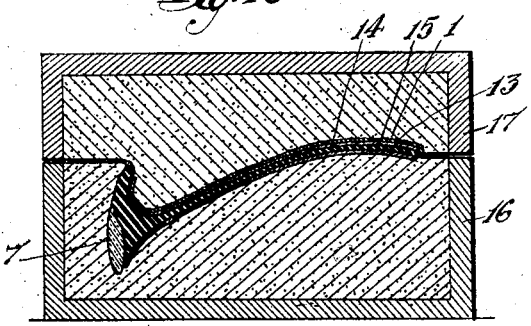
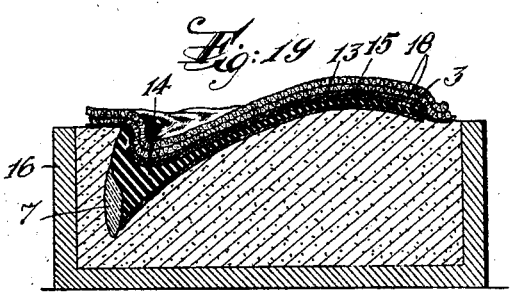
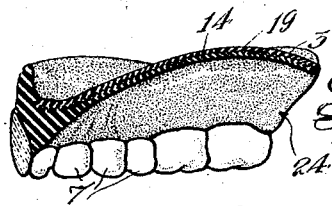
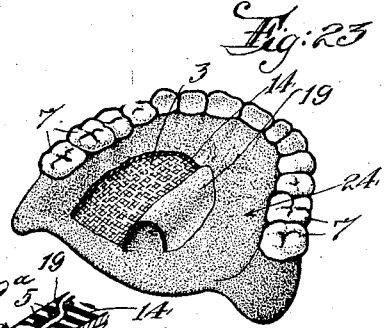
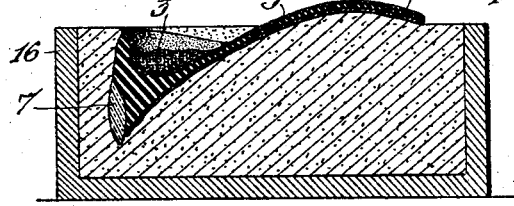
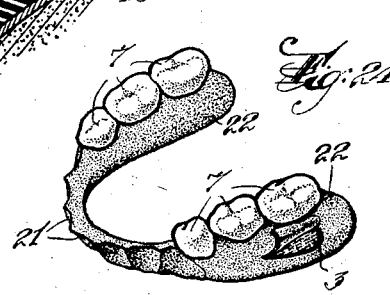
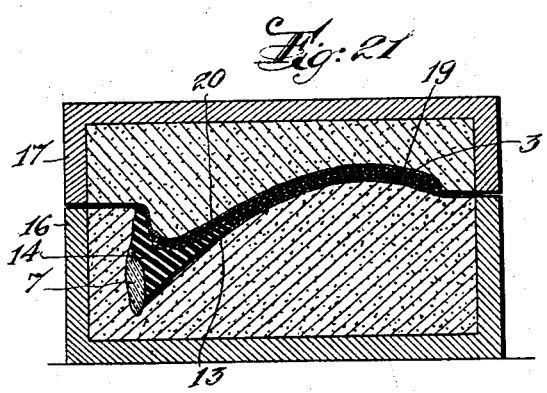
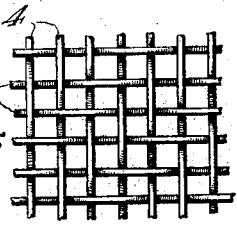

Patented Feb. 28, 1933

1,899,521

UNITED STATES PATENT OFFICE

UZA NUDELL, OF NEW YORK, N. Y., ASSIGNOR TO BAKER & COMPANY, INC., OF NEWARK, NEW JERSEY, A CORPORATION OF NEW JERSEY

METHOD OF MAKING REENFORCED VULCANITE DENTURES

Application filed November 2, 1931. Serial No. 572,593.

This invention relates in general to dentures constructed primarily of vulcanite or similar compositions, and more particularly the invention is directed toward the manufacture of vulcanized dentures having a reenforcement of wire gauze, mesh, or the like.

One object of the invention is to provide a novel and improved method of making whole or partial dentures of the character described whereby a sheet of wire gauze or the like can be accurately shaped upon a model and embedded and completely concealed in vulcanite or the like and the vulcanite can be molded to accurately conform to the hard palate and/or gums, so that the denture shall be strong, highly resistant to cracking, and shall accurately and comfortably fit the mouth.

Another object is to provide such a method whereby the denture shall be extremely thin, light in weight and snugly conform itself to the tissue.

A further object is to provide a method of making dentures of this character whereby the lingual surface of the denture can be molded with a highly polished lingual surface so as to obviate the necessity of burnishing or polishing the denture after the molding operation.

Other objects are to provide such a method including a novel and improved manner of inserting the reenforcement, such as wire gauze, in the vulcanite so that the reenforcement shall be completely concealed and shall be uniformly spaced throughout its area between the surfaces of the vulcanite; to provide a novel and improved denture of the character described which shall be stronger, thinner, lighter in weight, and more resistant to cracking and shall more accurately and comfortably conform to the hard palate and/or gums, than known dentures; and to obtain other advantages and results as will be brought out by the following description.

In the accompanying drawings I have shown the now preferred manner of making vulcanized dentures in accordance with the invention, but it should be understood that this is primarily for the purpose of illustrating the principles of the invention and that many modifications and changes may be made in the method and in the apparatus for performing it, without departing from the spirit or scope of the invention.

Referring to said drawings, in which corresponding and like parts are designated throughout the several views by the same reference characters, Figure 1 is a top plan view of an invested stone model of a mouth having a base plate swaged thereon;

Figure 2 is a similar view showing a palate plate swaged upon the base plate;

Figure 3 is a view similar to Figure 1, showing the manner of swaging the denture-reenforcing element, in the present instance a sheet of wire gauze;

Figure 4 is a top plan view of the completed reenforcing element;

Figure 5 is a plan view of a waxed case for a trial bite;

Figure 6 is a similar view, showing the teeth set in the wax;

Figure 7 is a side elevation of the waxed case shown in Figure 6;

Figure 8 is a transverse vertical sectional view through the waxed case and the dam or box set thereon for molding the die of the lingual portion of the waxed case;

Figure 9 is a similar view, showing the die molded;

Figure 10 is a side elevation of the die shown in Figure 1, with portions broken away and shown in section;

Figure 11 is a transverse vertical sectional view through a modelling ring, showing the manner of forming a counterdie from the die illustrated in Figure 10;

Figure 12 is a transverse vertical sectional view through the modelling ring shown in Figure 11, with a lingual veneer plate therein;

Figure 13 is a transverse vertical sectional view through the waxed case shown in Figures 6 and 7 with the veneer plate applied thereto;

Figure 14 is a transverse vertical sectional view through a flask with the waxed case mounted therein;

Figure 15 is a similar view of one section of the flask;

Figure 16 is a like view of the other section of the flask after the wax has been melted out;

Figure 17 is a transverse vertical sectional view through one section of the flask showing the first packing with the vulcanite composition;

Figure 18 is a transverse vertical sectional view through the completed flask, showing the first pressing of the vulcanizable composition;

Figure 19 is a view similar to Figure 17, showing the manner of inserting the denture-reenforcing element or wire gauze into the composition;

Figure 20 is a similar view, showing the next operation with the wire gauze embedded in the composition;

Figure 20a is an enlarged fragmentary sectional view showing the reenforcing element in the composition;

Figure 21 is a view similar to Figure 18, showing the next step in the method which consists in the application of the finishing layer of composition over the reenforcing element immediately before vulcanization;

Figure 22 is a transverse vertical sectional view through the completed vulcanized denture;

Figure 23 is a perspective view of the lingual side of the denture with portions of the vulcanized composition shown pulled back to illustrate the details of construction;

Figure 24 is a perspective view of a partial denture;

Figure 25 is a transverse vertical sectional view through the denture shown in Figure 24, illustrating the manner of applying it to the gums;

Figure 26 is an enlarged plan view of a piece of wire gauze from which the reenforcing element is formed, and Figures 27 and 28 are schematic plan views of the gauze on a reduced scale, showing the flexibility of the gauze.

Specifically describing the illustrated embodiment of the invention, the method is performed by first making an artificial stone model A in the usual manner as a reproduction of the mouth of the patient for which the plate is to be made. This model is then invested in modelling compound B in known manner. A base plate 1 of suitable metal is then swaged over the model A with a known press and according to a known method, for example as shown in Patent No. 1,794,197, so that the base plate constitutes an accurate reproduction of the palatal surface of the model A. The plate 1 is then trimmed to conform to the desired outline of the finished denture, after which it is replaced upon the model. A palatal plate 2 is similarly swaged upon the base plate 1.

Then the palatal plate 2 is removed and the denture-reenforcing element is formed. This reenforcing element is shown as consisting of a sheet of woven wire gauze 3 formed of a metal which will not be deleteriously affected by the vulcanizable composition to be used, for example vulcanite. The wires of the gauze are so woven that different portions of the sheet may relatively move in the plane of the sheet, and the sheet may be easily bent out of its plane and retain the shape into which it is bent.

As shown in Figures 26, 27 and 28 of the drawings, the gauze consists of the usual warp wires 4 and woof wires 5, and each warp wire is woven alternately over two woof wires and then under the next two adjacent woof wires, and the woof wires are similarly woven alternately over two warp wires and under the next two adjacent warp wires; each warp wire passes over one woof wire and under the other woof wire of the two woof wires over both of which the next adjacent warp wire passes, and the woof wires are similarly arranged with respect to the warp wires. With this construction, any portion of the sheet may be moved relatively to another portion in the plane of the sheet, as shown by Figure 28, and the sheet may be easily bent to form deep grooves or channels therein and retain the shape to which it is bent. This construction and function of the reenforcing element is extremely desirable in that it admits of the sheet of gauze being swaged to accurately conform to every groove and rib on the model or base plate 1, and further enhances the desired resiliency or flexibility of the finished denture, as will more fully hereinafter appear.

Obviously the flat sheet will first be approximately shaped to conform to the denture, and then roughly conformed to the base plate by the fingers of the operator. The sheet of gauze is then preferably covered by a piece of paper before it is put into the swaging press, so that the gauze is prevented from squeezing into the rubber disk of the swaging press, and the gauze may freely move upon the base plate relative to the rubber to ensure accurate shaping of the gauze. After the swaging, the gauze reenforcing element is given its final outline.

The palate plate is then secured to the base plate, as by wax, and wax 6 to receive artificial teeth is placed upon the assembled base and palate plates, as shown in Figure 5. The artificial teeth 7 are then set into the wax for taking a trial bite. This waxed case is particularly advantageous in the presence of the metal plates 1 and 2 instead of the usual wax plate, the metal being more easily handled by the dentist and being capable of positively retaining its shape during the taking of the trial bite.

The next step consists in the formation of a lingual veneer plate for use in molding the vulcanite so as to provide a highly polished surface on the lingual side of the finished denture without the necessity of polishing or burnishing the denture after the vulcanizing operation. This veneer plate is formed by building a dam or box 8 of carding wax or the like across the distal part of the waxed case, somewhat higher than the occlusal surfaces of the teeth and partially overlying the same, as shown in Figure 8. A die 9 of any suitable plastic material, for example, speedrock, is then molded to conform to the lingual surface of the waxed case, as shown in Figures 9 and 10. From this die is formed a counterdie 11 in modelling compound 12, as shown in Figure 11. Between the die 9 and the counterdie 11 is formed a veneer plate 13 of any suitable metal, so that the veneer plate conforms in shape to the lingual side of the denture, as shown in Figure 12. This veneer plate is then placed upon the waxed case, as shown in Figure 13, and the whole is invested in the usual manner, as shown in Figure 14, after which the wax is melted out to form the mold, as shown in Figure 15.

The part 16 of the flask containing the veneer plate and teeth is then packed with one layer of vulcanizable composition 14, for example vulcanite, and preferably covered with a thin flexible sheet 15 of highly glazed material which will not adhere to the composition. The palate plate is removed from the other section 17 of the flask but the base plate 1 is left therein, and the composition 14 is pressed into shape between the two sections of the flask with the base plate in position, as shown in Figure 18. The base plate and sheet 15 are then removed, and the reenforcing element 3 is placed upon the composition and preferably covered with the sheet 15 and two layers 18 of linen or like padding. The base plate is removed from the section 17 of the flask, and the flask is closed so as to press the reenforcing element 3 into the composition, as shown in Figures 20 and 20a. Another layer of composition 19 is then placed over the reenforcing element and covered with a sheet of material 20 like the sheet 15, after which the flask is closed as shown in Figure 21. The denture is then vulcanized in the usual way, after which the flask is opened, the denture removed therefrom, and the veneer plate removed from the lingual side of the denture.

The finished denture 24 has a highly polished lingual surface formed by the contact of the rubber with the metal veneer plate, so that there is no requirement for polishing or burnishing of the denture after the vulcanizing operation. Also, both the lingual and palatal surfaces of the denture are accurately shaped to conform to the mouth of the patient, as the result of the swaging and molding operations.

The completed denture 24 is extremely thin, and the reenforcing element is uniformly spaced and concealed throughout its area between the palatal and lingual surfaces of the denture. Due to the particular formation of the reenforcing element, the vulcanizable composition may freely pass through the interstices of the reenforcing element and obtain a firm bond or hold thereon, which would not be possible were the wire gauze of the usual weave. This will be more fully understood by noting that there is more surface area of each wire exposed for contact with the rubber than would be found in wire gauze of the usual weave.

The extreme thinness of the vulcanized denture provides the desirable flexibility, pliability or resiliency necessary for an accurate fitting or conformation of the denture to the palate and/or gums of the patient's mouth, and this flexibility is in no manner hindered or decreased, but rather is increased, by the reenforcing element, different portions of which due to its weave may move relatively to each other in the plane of the element. Furthermore, due to the swaging and accurate shaping of the reenforcing element and the capability thereof of retaining its shape, the vulcanized composition is influenced and held by the reenforcing element in proper shape, and is effectually reenforced against both distortion and cracking.

This invention may also be embodied in partial dentures 21, as shown in Figures 24 and 25, substantially the same method being utilized, the only difference being in the shape of the denture and therefore the shape of the reenforcing element. The invention is especially advantageous in partial dentures in that it provides a reenforced resiliency in the ends 22 of the denture, so that these ends may be pressed toward each other as shown by dot and dash lines in Figure 25 as the denture is applied to the mouth to permit the denture to easily and accurately conform to the gums 23, especially where such gums diverge toward each other, as shown in the drawings. Without such resiliency, a patient would find it difficult and uncomfortable to apply such a partial denture. Obviously without the reenforcement, the composition would not withstand such flexing or bending.

Having thus described the invention, what I claim is:

1. The method of making reenforced vulcanized dentures, consisting in swaging a base plate upon a model and a palate plate upon said base plate, swaging a sheet of wire gauze upon said base plate on the model, securing said palate plate and base plate in superposed relation and setting teeth in wax thereon, forming a die of the lingual portion of the waxed case, forming a counterdie from said die, shaping a veneer plate for the lingual surface of said waxed case between said die and counterdie, investing said waxed case with the veneer plate and melting out the wax, removing the palate plate, packing the flask with a layer of vulcanizable composition and pressing with the base plate in position, placing wire gauze in position on said composition with a layer of padding thereover and pressing again with the base plate removed to force gauze into the surface of the composition, removing padding, placing thin layer of composition over gauze, closing flask and vulcanizing, and removing denture from flask and veneer plate from the denture.

2. The method of making reenforced vulcanized dentures, consisting in swaging a base plate upon a model and a palate plate upon said base plate, swaging a sheet of wire gauze upon said base plate on the model, securing said palate plate and base plate in superposed relation and setting teeth in wax thereon, investing said waxed case and melting out the wax, removing the palate plate, packing the flask with a layer of vulcanizable composition and pressing with the base plate in position, placing wire gauze in position on said composition with a layer of padding thereover and pressing again with the base plate removed to force gauze into the surface of the composition, removing padding, placing thin layer of composition over gauze, closing flask and vulcanizing, and removing denture from flask.

UZA NUDELL.